(12) United States Patent
Schaude (10) Patent No.: US 11,080,177 B1
(45) Date of Patent: Aug. 3, 2021

(54) TEST CONTROLLER FOR CLOUD-BASED APPLICATIONS

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/866,533

(22) Filed: May 4, 2020

(51) Int. Cl.
*G06F 9/44* (2018.01)
*G06F 9/445* (2018.01)
*G06F 11/36* (2006.01)
*G06F 11/32* (2006.01)
*G06F 11/30* (2006.01)

(52) U.S. Cl.
CPC ...... *G06F 11/3688* (2013.01); *G06F 11/3006* (2013.01); *G06F 11/321* (2013.01); *G06F 11/326* (2013.01); *G06F 11/3684* (2013.01); *G06F 11/3692* (2013.01)

(58) Field of Classification Search
CPC ............. G06F 11/3688; G06F 11/3006; G06F 11/321; G06F 11/326; G06F 11/3684; G06F 11/3692
See application file for complete search history.

(56) References Cited

U.S. PATENT DOCUMENTS

| | | | | |
|---|---|---|---|---|
| 2010/0094886 A1* | 4/2010 | Krebs | ...................... | G09B 7/00 707/758 |
| 2016/0162389 A1* | 6/2016 | Lachwani | .................. | G06F 8/71 714/38.14 |
| 2018/0101473 A1* | 4/2018 | Slivkins | ................. | G06N 20/00 |
| 2018/0336123 A1* | 11/2018 | Benes | .................. | G06F 11/3688 |
| 2019/0149619 A1* | 5/2019 | Lisac | ................... | H04L 67/1097 709/203 |
| 2020/0052976 A1* | 2/2020 | Sherman | ................. | G06F 9/451 |
| 2020/0133826 A1* | 4/2020 | Cai | ..................... | G06F 11/3684 |
| 2020/0257539 A1* | 8/2020 | Borlick | .............. | G06F 11/0775 |

(Continued)

OTHER PUBLICATIONS

Win-Tsung Lo, An Architecture for Cloud Service Testing and Real Time Management, 2015, pp. 598-603. https://ieeexplore.ieee.org/stamp/stamp.jsp?tp=&arnumber=7273431 (Year: 2015).*

(Continued)

*Primary Examiner* — Mongbao Ngueyn
(74) *Attorney, Agent, or Firm* — Mintz Levin Cohn Ferris Glovsky and Popeo, P.C.

(57) ABSTRACT

A method for testing a cloud-based software application for offline operation may include generating a test user interface displaying a first result of the cloud-based software application operating in an offline mode and updating the test user interface to display a second result of the cloud-based software application operating in an online mode. Inconsistencies between the first result of the cloud-based software application operating in the offline mode and the second result of the cloud-based software application operating in the online mode may be detected based on the first result and the test result displayed in test user interface. A runtime environment of the cloud-based software application operating in the offline mode may be modified, for example, iteratively, in order to eliminate the inconsistencies between the first result and the second result. Related systems and articles of manufacture are also provided.

18 Claims, 5 Drawing Sheets

(56) References Cited

U.S. PATENT DOCUMENTS

2020/0320431 A1* 10/2020 Fly ..................... G06F 11/327

OTHER PUBLICATIONS

Xiaoying Bai, Cloud Testing Tools, 2011, pp. 1-12 https://www.researchgate.net/publication/220838758_Cloud_testing_tools (Year: 2011).*

Former Member, Creating an offline app with the mobile service for SAP Fiori—Part 1,2017, pp. 1-1. https://blogs.sap.com/2017/03/22/make-offline-app-using-sap-cp-mobile-service-for-sap-fiori-part-1/ (Year: 2017).*

Win-Tsung Lo, An Architecture for Cloud Service Testing and Real Time Management, 2015, pp. 598-603. https://ieeexplore.ieee.org/document/7273431 (Year: 2015).*

* cited by examiner

FIG. 1

| Amount | |
|---|---|
| 802,35 | EUR - Euro ⌄ |

Quantity  ← 250

| -98,11000000000001 | SEC – Second [unit of time] ⌄ |
|---|---|

Date

| 01.03.2020 | 📅 |
|---|---|

Date & Time

| 29.02.2020 | 📅 | 23:59 | ⌄ | GMTUK |
|---|---|---|---|---|

Time

| 11:33 |
|---|

Integer Value

| 8,4 |
|---|

Decimal Value

| 31.415,926 |
|---|

Short Text

| 1234567890<=>1234567890<=>1234567890 |
|---|

Medium Text

| 12345678901234567890abcdefghijklmnopqrstuvwxyz |
|---|

| Amount | |
|---|---|
| 802,35 | EUR - Euro ⌄ |

Quantity ← 250

| -98,11 | SEC – Second [unit of time] ⌄ |
|---|---|

Date

| 01.03.2020 | 📅 |
|---|---|

Date & Time

| 29.02.2020 | 📅 | 23:59 | ⌄ | GMTUK |
|---|---|---|---|---|

Time

| 11:37 |
|---|

Integer Value

| 8 |
|---|

Decimal Value

| 31.415,93 |
|---|

Short Text

| 1234567890<=>1234567890<=>1234567890 |
|---|

Medium Text

| 12345678901234567890abcdefghijklmnopqrstuvwxyz |
|---|

TEST CONTROLLER FOR CLOUD-BASED APPLICATIONS

TECHNICAL FIELD

The subject matter described herein relates generally to cloud computing and more specifically to a test controller for a cloud-based application.

BACKGROUND

Many enterprises may rely on enterprise software applications to provide solutions for billing, invoicing, procurement, payroll, time and attendance management, recruiting and onboarding, learning and development, performance and compensation, workforce planning, and/or the like. Examples of enterprise software applications may include enterprise resource planning (ERP) software, customer relationship management (CRM) software, and/or the like. To provide access to multiple end users, who may often be geographically disparate, enterprise software applications may be hosted on a cloud-computing platform such that the functionalities of the enterprise software applications are available for remote access. For instance, some enterprise software applications may be deployed as a cloud-based service including, for example, a software as a service (SaaS) and/or the like.

SUMMARY

Systems, methods, and articles of manufacture, including computer program products, are provided for testing a cloud-based software application for offline operation. In one aspect, there is provided a system. The system may include at least one data processor and at least one memory. The at least one memory may store instructions that result in operations when executed by the at least one data processor. The operations may include: generating a test user interface displaying a first result of a cloud-based software application performing one or more operations in an offline mode; updating the test user interface to display a second result of the cloud-based software application performing the one or more operations in an online mode; detecting, based at least on the first result and the second result displayed in the test user interface, one or more inconsistencies between the first result of the cloud-based software application operating in the offline mode and the second result of the cloud-based software application operating in the online mode; and in response to detecting the one or more inconsistencies, modifying a first runtime environment of the cloud-based software application operating in the offline mode.

In some variations, one or more features disclosed herein including the following features may optionally be included in any feasible combination. The cloud-based software application operating in the online mode may require a network connection to a backend platform providing one or more remote resources. The cloud-based software application operating in the offline mode may not require the network connection to the backend platform.

In some variations, the one or more inconsistencies may be associated with the cloud-based software application being executed in the first runtime environment while the cloud-based software application operates in the offline mode and the cloud-based software application being executed in a second runtime environment while the cloud-based software application operates in the online mode.

In some variations, the first runtime environment may be run at a client. The second runtime environment may be run at the backend system.

In some variations, the first runtime environment may be an Advanced Business Application Programming (ABAP) runtime environment. The second runtime environment may be a JavaScript runtime environment.

In some variations, the one or more inconsistencies may include a difference in a value and/or a datatype of the first result generated by the cloud-based software application operating in the offline mode and the second result generated by the cloud-based software application operating in the online mode.

In some variations, the first runtime environment may be modified to eliminate the one or more inconsistencies.

In some variations, the modifying may include applying a first modification before applying a second modification in response to detecting one or more remaining inconsistencies between the first result of the cloud-based software application operating in the offline mode and the second result of the cloud-based software application operating in the online mode.

In some variations, the first result and the second result may be generated by the cloud-based software application performing the one or more operations based on a same input.

In some variations, the one or more operations may include an arithmetic operation, a logical operation, a programing operation, and/or an enterprise specific operation.

In some variations, the one or more operations may include a first operation that the cloud-based software application is capable of performing in the offline mode. The one or more operations may exclude a second operation that the cloud-based software application is capable of performing in the online mode but not in the offline mode.

In another aspect, there is provided a method for testing a cloud-based software application for offline operation. The method may include: generating a test user interface displaying a first result of a cloud-based software application performing one or more operations in an offline mode; updating the test user interface to display a second result of the cloud-based software application performing the one or more operations in an online mode; detecting, based at least on the first result and the second result displayed in the test user interface, one or more inconsistencies between the first result of the cloud-based software application operating in the offline mode and the second result of the cloud-based software application operating in the online mode; and in response to detecting the one or more inconsistencies, modifying a first runtime environment of the cloud-based software application operating in the offline mode.

In some variations, one or more features disclosed herein including the following features may optionally be included in any feasible combination. The cloud-based software application operating in the online mode may require a network connection to a backend platform providing one or more remote resources. The cloud-based software application operating in the offline mode may not require the network connection to the backend platform.

In some variations, the one or more inconsistencies may be associated with the cloud-based software application being executed in the first runtime environment while the cloud-based software application operates in the offline mode and the cloud-based software application being executed in a second runtime environment while the cloud-based software application operates in the online mode.

In some variations, the first runtime environment may be an Advanced Business Application Programming (ABAP) runtime environment. The second runtime environment may be a JavaScript runtime environment.

In some variations, the one or more inconsistences may include a difference in a value and/or a datatype of the first result generated by the cloud-based software application operating in the offline mode and the second result generated by the cloud-based software application operating in the online mode.

In some variations, the first runtime environment may be modified to eliminate the one or more inconsistences. The modifying may include applying a first modification before applying a second modification in response to detecting one or more remaining inconsistencies between the first result of the cloud-based software application operating in the offline mode and the second result of the cloud-based software application operating in the online mode.

In some variations, the first result and the second result may be generated by the cloud-based software application performing the one or more operations based on a same input.

In some variations, the one or more operations may include a first operation that the cloud-based software application is capable of performing in the offline mode. The one or more operations may exclude a second operation that the cloud-based software application is capable of performing in the online mode but not in the offline mode.

In another aspect, there is provided a computer program product that includes a non-transitory computer readable storage medium. The non-transitory computer-readable storage medium may include program code that causes operations when executed by at least one data processor. The operations may include: generating a test user interface displaying a first result of a cloud-based software application performing one or more operations in an offline mode; updating the test user interface to display a second result of the cloud-based software application performing the one or more operations in an online mode; detecting, based at least on the first result and the second result displayed in the test user interface, one or more inconsistencies between the first result of the cloud-based software application operating in the offline mode and the second result of the cloud-based software application operating in the online mode; and in response to detecting the one or more inconsistencies, modifying a first runtime environment of the cloud-based software application operating in the offline mode.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to testing a cloud-based software application for offline operation, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A conventional cloud-based software application may rely on remote resources including, for example, data storage, computing power, and/or the like. As such, a conventional cloud-based software application may be unable to operate in an offline mode at least because an active network connection may be required to access the remote resources. This inability to operate in an offline mode may prevent a conventional cloud-based software application from being available in mobile settings such as, for example, on mobile devices that may not have a consistent network connection. Accordingly, in some example embodiments, a cloud-based software application may be configured to operate in an offline mode. For example, when operating in the offline mode, the cloud-based software application may not require an active network connection to access remote resources such as data storage, computing power, and/or the like.

In some example embodiments, a test controller may be configured to test the cloud-based software application for offline operation. For example, the test controller may perform one or more tests to determine whether a result generated by the cloud-based software application operating in an offline mode is consistent with a result generated by the cloud-based software application operating in the online mode. Various inconsistencies may arise, for example, due to the cloud-based software application executing in a different runtime environment when the cloud-based software application is executing in the offline mode than when the cloud-based software application is operating in the online mode.

Differences in runtime environment may, as noted, engender inconsistencies in the results generated cloud-based software application. These inconsistencies may include differences in the value and/or datatype of the result generated by the cloud-based software application operating in the offline mode and the result generated by the cloud-based software application operating in the online mode. The offline runtime environment, which may include, which may include the libraries, variables, configuration files, and/or services required for executing the cloud-based software application offline, may be modified in order to eliminate the inconsistencies between the result generated by the cloud-based software application operating in the offline mode and the result generated by the cloud-based software application operating in the online mode.

In some example embodiments, the test controller may test the cloud-based software application by at least generating a test user interface configured to display a result of one or more operations that may be performed by the cloud-based software application. While in the offline mode, the cloud-based software application may perform some but not all of the operations that the cloud-based software application may be capable of performing in the online mode. Examples of operations performed by the cloud-based software application in the offline mode may include arithmetic operations, logical operations, programing operations, enterprise specific operations, and/or the like.

In some example embodiments, the test controller may generate the test user interface to display the result of the operations performed by the cloud-based software application operating in the online mode. The same test user interface may also be used to display the result of the operations performed by the cloud-based software application operating in the offline mode. The same input may be provided to the cloud-based software application operating in the online mode and to the cloud-based software application operating in the offline mode. As such, inconsistencies between the results generated cloud-based software application operating in the offline mode and the results generated by the cloud-based software application operating in the online mode may be attributable to differences between the offline runtime environment and the online runtime environment.

In some implementations of the current subject matter, inconsistencies between the result generated by the cloud-based software application operating in the offline mode and the result generated by the cloud-based software application operating in the online mode may be determined based at least on the differences in the results displayed in the test user interface. These inconsistencies may, as noted, include differences in the value and/or datatype of the result generated by the cloud-based software application operating in the offline mode and the result generated by the cloud-based software application operating in the online mode. Moreover, the presence of such inconsistencies may trigger a modification of the offline runtime environment that includes the libraries, variables, configuration files, and/or services required for executing the cloud-based software application offline (e.g., without an active network connection).

Figure 1:
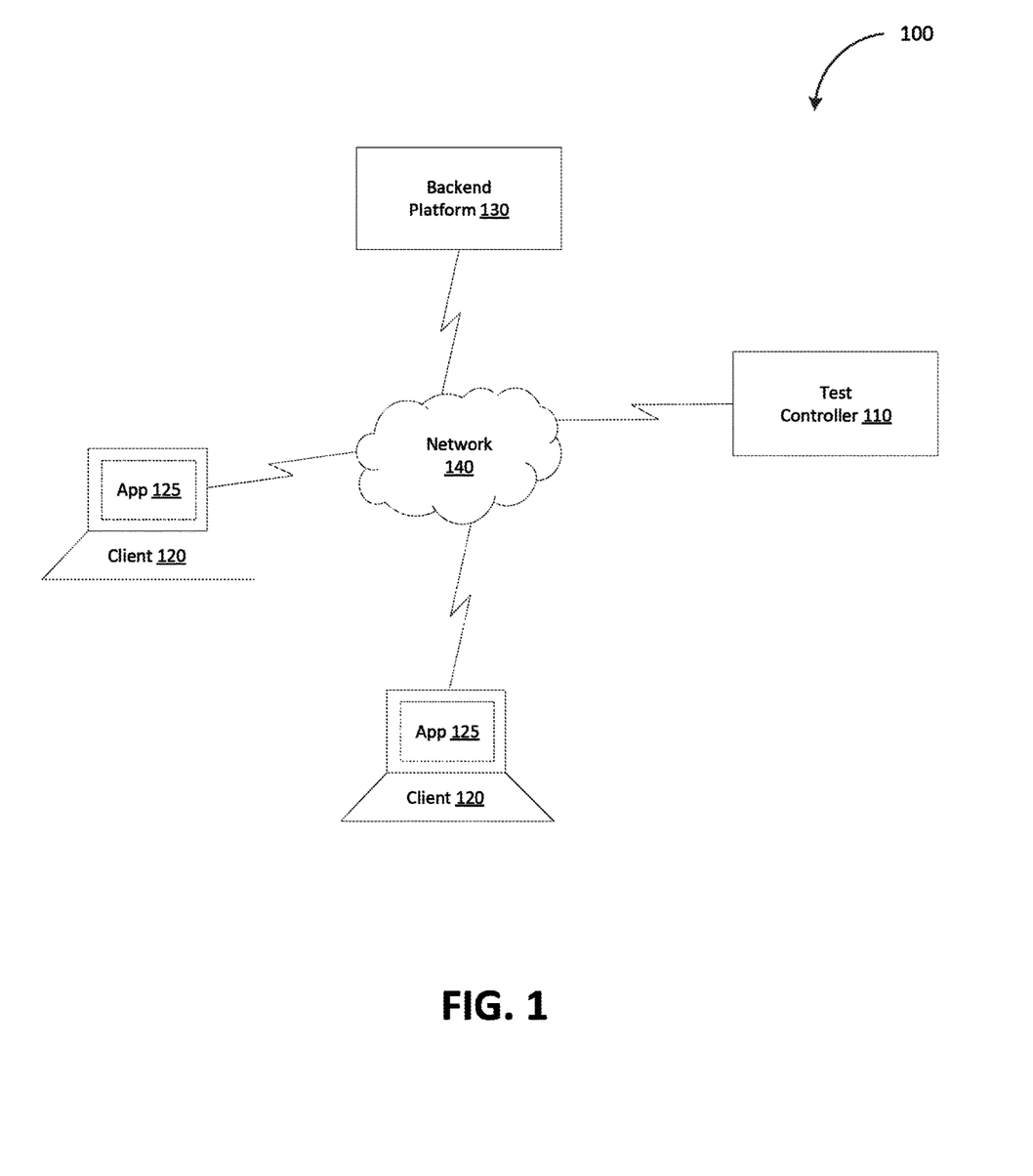
FIG. 1 depicts a system diagram illustrating an example of a testing system, in accordance with some example embodiments.

FIG. 1 depicts a system diagram illustrating an example of a testing system 100, in accordance with some example embodiments. Referring to FIG. 1, the testing system 100 may include a test controller 110, a client 120, and a backend platform 130. The test controller 110, the client 120, and the backend platform 130 may be communicatively coupled via a network 140. The network 140 may be a wired network and/or a wireless network including, for example, a local area network (LAN), a virtual local area network (VLAN), a wide area network (WAN), a public land mobile network (PLMN), the Internet, and/or the like.

As shown in FIG. 1, an application 125 at the client 120 may be a cloud-based software application associated with the backend platform 130. The application 125 may operate in an online mode as well as in an offline mode. The application 125 operating in the online mode may require an active network connection to the backend platform 130. For example, while operating in the online mode, the application 125 may access, via the network 140, one or more remote resources (e.g., data storage, computing power, and/or the like) provided by the backend platform 130. Alternatively, the application 125 may also operate in the offline mode, in which case the application 125 may operate without an active network connection to the backend platform 130. For instance, while in the offline mode, the application 125 may operate without accessing, via the network 140, the remote resources provided by the backend platform 130.

In some example embodiments, the test controller 110 may be configured to test the application 125 for offline operation. For example, the test controller 110 may perform one or more tests to determine whether a first result generated by the application 125 operating in the offline mode is consistent with a second result generated by the application 125 operating in the online mode. The first result and the second result may be generated by the application 125 based on a same input. As such, inconsistencies between the first result and the second result may arise due to the application 125 executing in a different runtime environment when the application 125 is operating in the offline mode than when the application 125 is operating in the online mode. For instance, while the application 125 is operating in the online mode, the application 125 may be executing in a first runtime environment (e.g., an Advanced Business Application Programming (ABAP) runtime environment and/or the like) running at the backend platform 130. Contrastingly, while the application 125 is operating in the offline mode, the application 125 may be executing in a second runtime environment (e.g., a JavaScript runtime environment and/or the like) running at the client 120.

As noted, differences in runtime environment may engender inconsistencies between the first result generated by the application 125 operating in the offline mode and the second result generated by the application 125 operating in the online mode. These inconsistencies may include, for example, differences between the value and/or datatype of the first result generated by the application 125 operating in the offline mode and the second result generated by the application 125 operating in the online mode. The offline runtime environment (e.g., the JavaScript runtime environment and/or the like) may include the libraries, variables, configuration files, and/or services required for executing the application 125 offline. In response to the test controller 110 detecting one or more inconsistencies between the first result generated by the application 125 operating in the offline mode and the second result generated by the application 125 operating in the online mode, the offline runtime environment may be modified to eliminate these inconsistencies. For instance, the offline runtime environment may be modified iteratively until the first result generated by the application 125 operating in the offline mode is consistent with the second result generated by the application 125 operating in the online mode.

In some example embodiments, in order to detect inconsistencies between a result of operations performed by the application 125 in the offline mode and a result of the same operations performed by the application 125 in the online mode, the test controller 110 may generate a test user interface configured to display the result of the operations performed by the application 125 in the offline mode and the result of the same operations performed by the application 125 in the online mode. The test controller 110 may provide the same input to the application 125 performing the operations in the online mode and to the application 125 performing the operations in the offline mode. As such, inconsistencies between the results generated application 125 operating in the offline mode and the results generated by the application 125 operating in the online mode may be attributable to differences between the offline runtime environment and the online runtime environment.

It should be appreciated that the application 125 operating in the offline mode may be capable of performing some but not all of the operations that the application 125 may be capable of performing in the online mode. As such, the test user interface may be generated to include the result of a first operation that the application 125 is capable of performing in the offline mode and to exclude the result of a second operation that the application 125 is capable of performing in the online mode but not in the offline mode. Examples of operations the application 125 is capable of performing in the offline mode may include arithmetic operations, logical operations, programing operations, enterprise specific operations, and/or the like.

Figure 2:
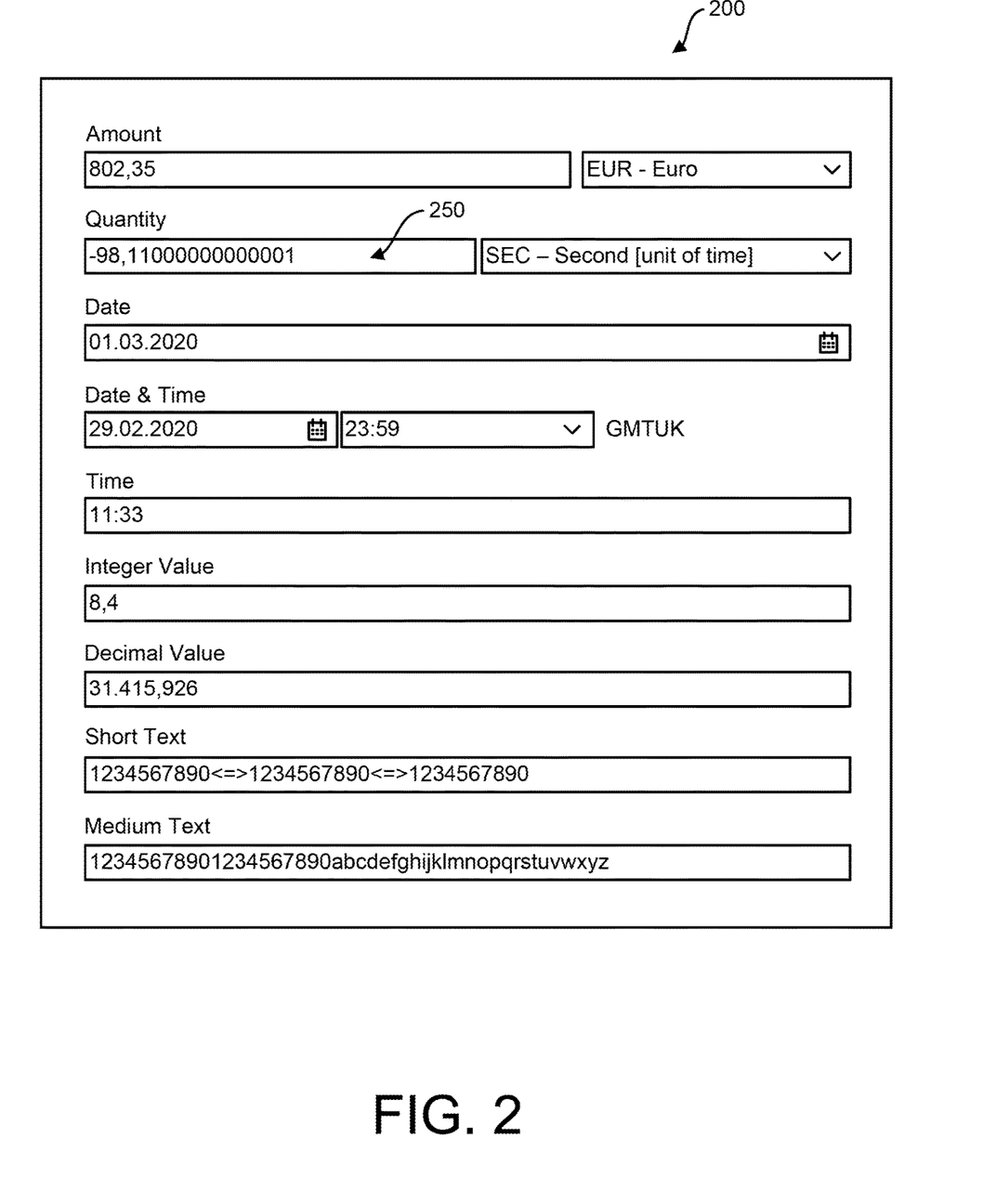
FIG. 2 depicts a test user interface displaying an example of results generated by a cloud-based software application operating in an online mode, in accordance with some example embodiments.
Figure 3:
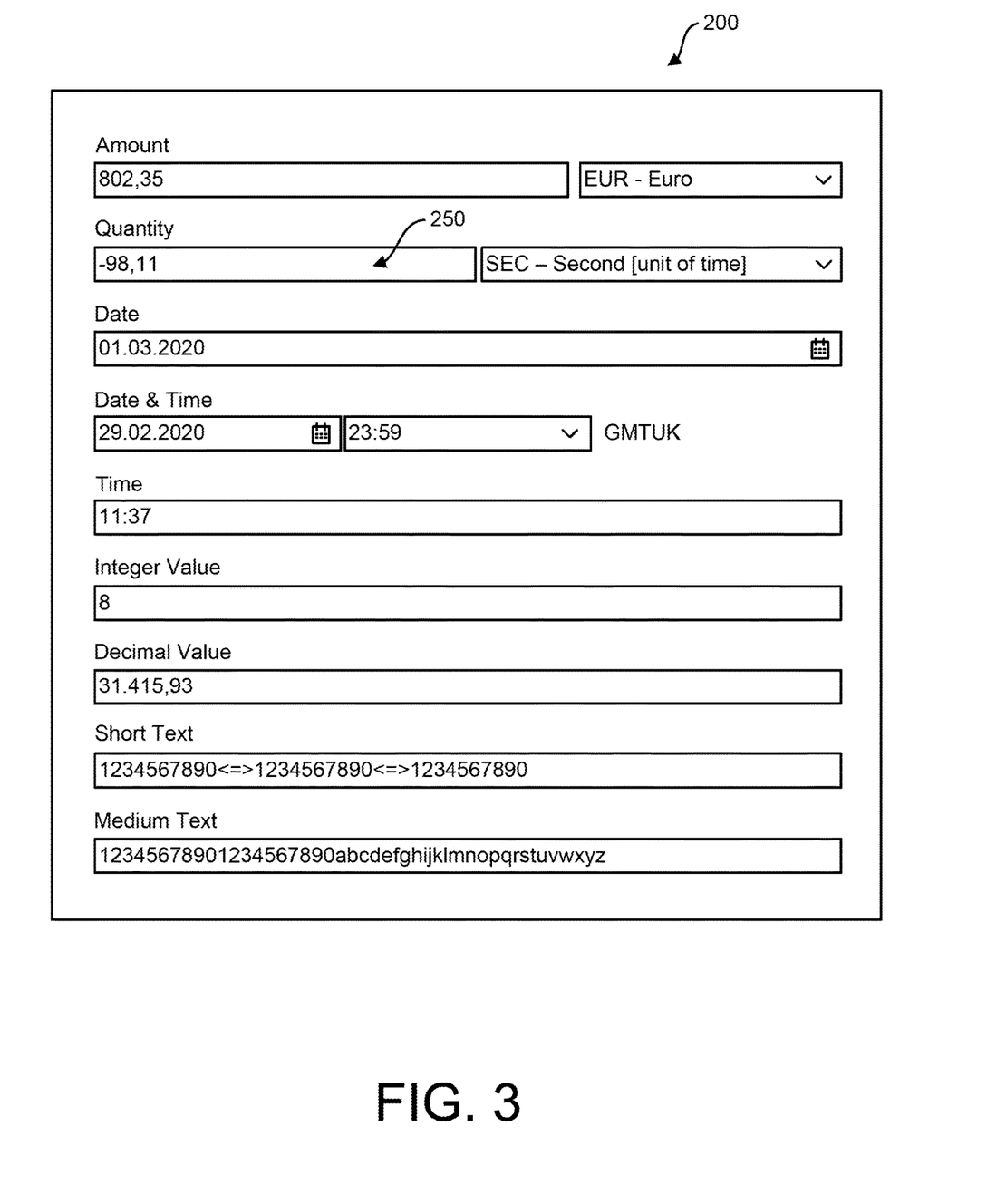
FIG. 3 depicts a test user interface displaying an example of results generated by a cloud-based software application operating in an offline mode, in accordance with some example embodiments.

To further illustrate, FIG. 2 depicts a test user interface 200 displaying an example of results generated by the application 125 operating in the offline mode, in accordance with some example embodiments. As shown in FIG. 2, the test user interface 200 may display the first result of the application 125 performing the one or more operations in the offline mode. Meanwhile, FIG. 3 depicts the test user interface 200 displaying an example of results generated by the application 125 operating in the online mode. FIG. 3 shows the test user interface 200 displaying the second result of the application 125 performing the same operations in the online mode. As noted, the test controller 110 may provide a same input to the application 125 whether the application 125 is performing the one or more operations in the offline mode or in the online mode. As such, inconsistencies between the first result displayed by the test user interface 200 shown in FIG. 2 and the second result displayed by the test user interface 200 shown in FIG. 3 may be attributable to the differences in offline runtime environment and online runtime environment instead of differences in input.

In some example embodiments, the test controller 110 may determine, based at least on the first result displayed in the test user interface 200 and the second result displayed in the test user interface 200, one or more inconsistencies between the first result generated by the application 125 operating in the offline mode and the second result generated by the application 125 operating in the online mode. These inconsistencies may, as noted, include differences in the value and/or datatype of the first result generated by the application 125 operating in the offline mode and the second result generated by the application 125 operating in the online mode.

As shown in FIGS. 2-3, the first result that is generated by the application 125 operating in the offline mode may include at least on inconsistency in the datatype of the value displayed in a field 250 of the test user interface 200. In the example shown in FIGS. 2-3, the application 125 may generate a floating point value while operating in the offline mode and an integer value while operating in the online mode. As noted, this inconsistency may arise due to the application 125 executing in a different runtime environment when the application 125 is operating in the offline mode than when the application 125 is operating in the online mode.

Accordingly, in some example embodiments, the test controller 110 may modify, based at least on the differences between the first result and the second result displayed in the test user interface 200, the offline runtime environment. The test controller 110 may modify the offline runtime environment iteratively until the first result generated by the application 125 operating in the offline mode is consistent with the second result generated by the application 125 operating in the online mode. For example, the test controller 110 may apply, to the offline runtime environment, one or more modifications until no differences exist between the first result and the second result displayed in the test user interface 200.

Figure 4:
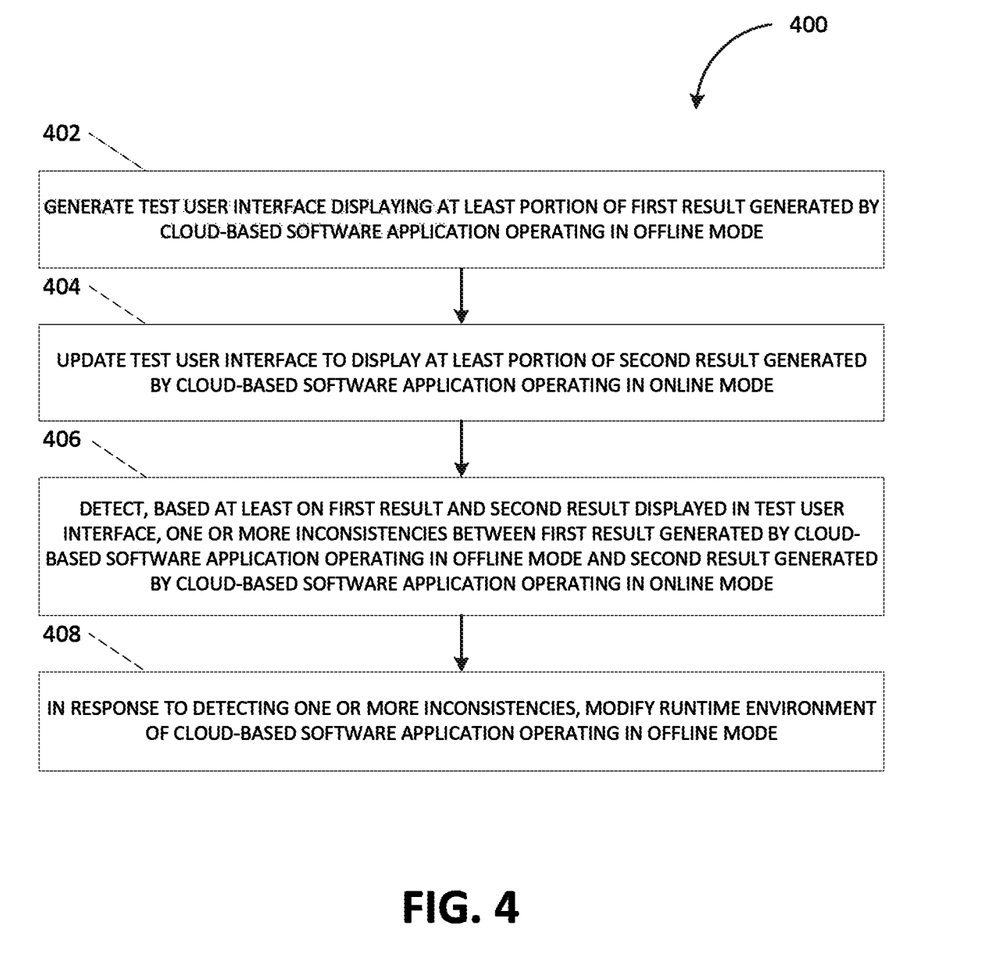
FIG. 4 depicts a flowchart illustrating a process for testing a cloud-based software application for offline operation, in accordance with some example embodiments.

FIG. 4 depicts a flowchart illustrating a process 400 for testing a cloud-based software application for offline operation, in accordance with some example embodiments. Referring to FIGS. 1-4, the process 400 may be performed by the test controller 110 in order to test the application 125 for operating in the offline mode (e.g., without an active network connection to the backend system 130).

At 402, the test controller 110 may generate a test user interface displaying at least a portion of a first result of the cloud-based software application operating in an offline mode. For example, as shown in FIG. 2, the test controller 110 may generate the test user interface 200 displaying the first result of the application 125 operating in the offline mode, for example, at the client 120. While operating in the offline mode, the application 125 may perform one or more operations including, for example, arithmetic operations, logical operations, programing operations, enterprise specific operations, and/or the like. According to some example embodiments, while in operating in the offline mode, the application 125 may perform these operations without an active network connection to the backend platform 130. That is, while operating in the offline mode, the application 125 may perform one or more operations without accessing, via the network 130, one or more remote resources (e.g., data storage, computing power, and/or the like) provided by the backend platform 130.

At 404, the test controller 110 may update the test user interface to display at least a portion of a second result of the cloud-based software application operating in an online mode. For example, FIG. 3 shows the test user interface 200 displaying the second result generated by the application 125 operating in the online mode. While operating in the online mode, the application 125 may perform at least some of the same operations that the application 125 may perform while operating in the offline mode. However, an active network connection may be required for the application 125 to operate in the online mode. Accordingly, while the application 125 is performing operations in the online mode, the application 125 may access, via the network 130, one or more remote resources (e.g., data storage, computing power, and/or the like) provided by the backend platform 130.

At 406, the test controller 110 may detect, based at least on the first result and the second result displayed in the test user interface, one or more inconsistencies between the first result generated by the cloud-based software application operating in the offline mode and the second result generated by the cloud-based software application operating in the online mode. While the application 125 is operating in the online mode, the application 125 may be executing in a first runtime environment (e.g., an Advanced Business Application Programming (ABAP) runtime environment and/or the like) running at the backend platform 130. Contrastingly, while the application 125 is operating in the offline mode, the application 125 may be executing in a second runtime environment (e.g., a JavaScript runtime environment and/or the like) running at the client 120. This difference in runtime environments may give rise to inconsistencies between the first result generated by the application 125 operating in the offline mode and the second result generated by the application 125 operating in the online mode. Examples of these inconsistencies may include differences between the value and/or datatype of the first result generated by the application 125 operating in the offline mode and the second result generated by the application 125 operating in the online mode.

In some example embodiments, the test controller 110 may detect, based at least on the first result and the second result displayed in the test user interface 200, inconsistencies between the first result generated by the application 125 operating in the offline mode and the second result generated by the application 125 operating in the online mode. These inconsistencies may be detected, for example, based on differences in the first result and the second result displayed in the test user interface 200. Because the controller 110 may provide the same input to the application 125 operating in the online mode and the application operating in the offline mode, differences between the first result of the application 125 performing one or more operations in the online mode and the second result of the application 125 performing the same operations in the offline mode may be attributable to differences between the online runtime environment and the offline runtime environment. In the example shown in FIGS. 2-3, the test controller 110 may detect, based at least on the first result and the second result displayed in the test user interface 200, at least one inconsistency in the application 125 generating a floating point value as a result of performing an operation in in the offline mode and the application 125 generating an integer value as a result of performing the same operation in the online mode.

At 408, the test controller 110 may respond to detecting the one or more inconsistencies by at least modifying a runtime environment of the cloud-based software application operating in the offline mode. For example, the test controller 110 may modify the offline runtime environment of the application 125 in response to detecting the presence of one or more inconsistencies between the first result generated by the application 125 operating in the offline mode and the second result generated by the application 125 operating in the online mode. In some example embodiments, the test controller 110 may modify the offline runtime environment iteratively in order to eliminate the one or more inconsistencies between the first result generated by the application 125 operating in the offline mode and the second result generated by the application 125 operating in the online mode. For instance, subsequent to applying a first modification to the offline runtime environment, the test controller 110 may apply a second modification to the offline runtime environment if the test controller 110 detects one or more remaining inconsistencies between the first result generated by the application 125 operating in the offline mode and the second result generated by the application 125 operating in the online mode.

Figure 5:
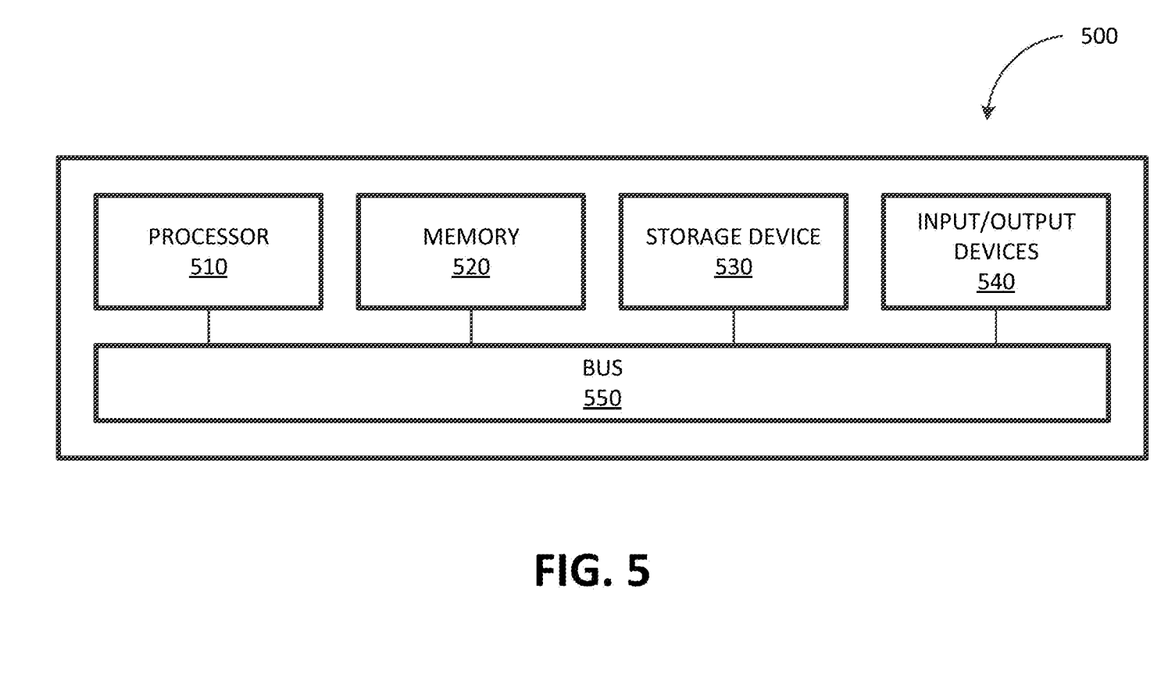
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the test controller 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the test controller 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one or more processors; and
   at least one memory storing instructions which, when executed by the at least one data processor, result in operations comprising:
   generating a test user interface displaying a first result of a cloud-based software application performing one or more operations in an offline mode in which the one or more operations are performed without a network connection to a backend platform providing one or more remote resources;
   updating the test user interface to display a second result of the cloud-based software application performing the one or more operations in an online mode in which the one or more operations are performed with the network connection to the backend platform providing the one or more remote resources;
   detecting, based at least on the first result and the second result displayed in the test user interface, one or more inconsistencies between the first result of the cloud-based software application operating in the offline mode and the second result of the cloud-based software application operating in the online mode, the one or more inconsistencies including a difference in a value and/or a datatype of the first result generated by the cloud-based software application operating in the offline mode and the second result generated by the cloud-based software application operating in the online mode; and in response to detecting the one or more inconsistencies, modifying a first runtime environment of the cloud-based software application operating in the offline mode.

2. The system of claim 1, wherein the cloud-based software application operating in the online mode requires the network connection to the backend platform providing one or more remote resources, and wherein the cloud-based software application operating in the offline mode does not require the network connection to the backend platform.

3. The system of claim 1, wherein the one or more inconsistencies are associated with the cloud-based software application being executed in the first runtime environment while the cloud-based software application operates in the offline mode and the cloud-based software application being executed in a second runtime environment while the cloud-based software application operates in the online mode.

4. The system of claim 3, wherein the first runtime environment is run at a client, and wherein the second runtime environment is run at a backend system.

5. The system of claim 3, wherein the first runtime environment comprises an Advanced Business Application Programming (ABAP) runtime environment, and wherein the second runtime environment comprises a JavaScript runtime environment.

6. The system of claim 1, wherein the first runtime environment is modified to eliminate the one or more inconsistences.

7. The system of claim 1, wherein the modifying includes applying a first modification before applying a second modification in response to detecting one or more remaining inconsistencies between the first result of the cloud-based software application operating in the offline mode and the second result of the cloud-based software application operating in the online mode.

8. The system of claim 1, wherein the first result and the second result are generated by the cloud-based software application performing the one or more operations based on a same input.

9. The system of claim 1, wherein the one or more operations include an arithmetic operation, a logical operation, a programing operation, and/or an enterprise specific operation.

10. The system of claim 1, wherein the one or more operations includes a first operation that the cloud-based software application is capable of performing in the offline mode, and wherein the one or more operations excludes a second operation that the cloud-based software application is capable of performing in the online mode but not in the offline mode.

11. A computer-implemented method, comprising:
generating a test user interface displaying a first result of a cloud-based software application performing one or more operations in an offline mode in which the one or more operations are performed without a network connection to a backend platform providing one or more remote resources;
updating the test user interface to display a second result of the cloud-based software application performing the one or more operations in an online mode in which the one or more operations are performed with the network connection to the backend platform providing the one or more remote resources;
detecting, based at least on the first result and the second result displayed in the test user interface, one or more inconsistencies between the first result of the cloud-based software application operating in the offline mode and the second result of the cloud-based software application operating in the online mode, the one or more inconsistencies including a difference in a value and/or a datatype of the first result generated by the cloud-based software application operating in the offline mode and the second result generated by the cloud-based software application operating in the online mode; and
in response to detecting the one or more inconsistencies, modifying a first runtime environment of the cloud-based software application operating in the offline mode.

12. The method of claim 11, wherein the cloud-based software application operating in the online mode requires the network connection to the backend platform providing one or more remote resources, and wherein the cloud-based software application operating in the offline mode does not require the network connection to the backend platform.

13. The method of claim 11, wherein the one or more inconsistencies are associated with the cloud-based software application being executed in the first runtime environment while the cloud-based software application operates in the offline mode and the cloud-based software application being executed in a second runtime environment while the cloud-based software application operates in the online mode.

14. The method of claim 13, wherein the first runtime environment comprises an Advanced Business Application Programming (ABAP) runtime environment, and wherein the second runtime environment comprises a JavaScript runtime environment.

15. The method of claim 11, wherein the first runtime environment is modified to eliminate the one or more inconsistences, and wherein the modifying includes applying a first modification before applying a second modification in response to detecting one or more remaining inconsistencies between the first result of the cloud-based software application operating in the offline mode and the second result of the cloud-based software application operating in the online mode.

16. The method of claim 11, wherein the first result and the second result are generated by the cloud-based software application performing the one or more operations based on a same input.

17. The method of claim 11, wherein the one or more operations includes a first operation that the cloud-based software application is capable of performing in the offline mode, and wherein the one or more operations excludes a second operation that the cloud-based software application is capable of performing in the online mode but not in the offline mode.

18. A non-transitory computer readable medium storing instructions, which when executed by at least one or more processors, result in operations comprising:
generating a test user interface displaying a first result of a cloud-based software application performing one or more operations in an offline mode in which the one or more operations are performed without a network connection to a backend platform providing one or more remote resources;
updating the test user interface to display a second result of the cloud-based software application performing the one or more operations in an online mode in which the one or more operations are performed with the network connection to the backend platform providing the one or more remote resources;
detecting, based at least on the first result and the second result displayed in the test user interface, one or more inconsistencies between the first result of the cloud-based software application operating in the offline mode and the second result of the cloud-based software application operating in the online mode, the one or more inconsistencies including a difference in a value and/or a datatype of the first result generated by the cloud-based software application operating in the offline mode and the second result generated by the cloud-based software application operating in the online mode; and in response to detecting the one or more inconsistencies, modifying a first runtime environment of the cloud-based software application operating in the offline mode.

\* \* \* \* \*